(12) United States Patent
Hernandez et al.

(10) Patent No.: US 8,707,017 B2
(45) Date of Patent: Apr. 22, 2014

(54) METHOD AND SYSTEM FOR MANAGING CORE CONFIGURATION INFORMATION

(75) Inventors: Thomas J. Hernandez, Portland, OR (US); Kaveh Nasri, Portland, OR (US); Robert P. Hale, Portland, OR (US); John P. Lambino, Beaverton, OR (US); Greg L. Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 660 days.

(21) Appl. No.: 11/321,406

(22) Filed: Dec. 29, 2005

(65) Prior Publication Data

US 2007/0157051 A1    Jul. 5, 2007

(51) Int. Cl.
*G06F 9/00* (2006.01)

(52) U.S. Cl.
USPC .................................. 713/1; 714/6.3; 711/162

(58) Field of Classification Search
USPC ..................................... 713/1; 714/5; 711/162
See application file for complete search history.

(56) References Cited

U.S. PATENT DOCUMENTS

| | | | | |
|---|---|---|---|---|
| 5,745,669 | A * | 4/1998 | Hugard et al. | 714/3 |
| 6,438,687 | B2 * | 8/2002 | Klein | 713/1 |
| 6,993,649 | B2 * | 1/2006 | Hensley | 713/2 |
| 2006/0020844 | A1 * | 1/2006 | Gibbons et al. | 714/2 |

OTHER PUBLICATIONS

"Microsoft's System Restore Technology included in Windows XP", 4 pages.
"Phoenix FirstWare Recover", http://www.phoenix.com/en/Products/Trusted+Applications/Phoenix+FirstWare/FirstWare+Vault/default.htm, 3 pages.
"Phoenix FirstWare Vault", http://www.phoenix.com/en/Products/Trusted+Applications/Phoenix+FirstWare/FirstWare+Vault/default.htm, 5 pages.

* cited by examiner

*Primary Examiner* — Thuan Du
(74) *Attorney, Agent, or Firm* — Blakely, Sokoloff, Taylor & Zafman LLP

(57) ABSTRACT

Embodiments of a method and system for managing a system are disclosed herein. The method and system provides a means to permanently and/or securely store core system configuration information so that the core system configuration information stays with a particular system, such as a computing device or motherboard for example. The method and system provide a means for channel integrators, manufacturers, and technicians to quickly troubleshoot and return a system to full service after receiving the system from a customer as part of an unstable, non-functioning, or other system service event. Other embodiments are described and claimed.

21 Claims, 4 Drawing Sheets

METHOD AND SYSTEM FOR MANAGING CORE CONFIGURATION INFORMATION

BACKGROUND OF THE DISCLOSURE

In recent years, consumer demand for personal computers (PCs) and other computing systems has increased dramatically. Some of the demand is due to lower prices as well as the relative ease of using such a system with user-friendly software applications. As with any human engineered system however, computing systems can and do malfunction from time to time for various reasons. The causes which give rise to such malfunctions include attempts by customers to add-on or reconfigure hardware and/or software associated with a system. While being viewed increasingly as a commodity item, the PC remains an "open box" environment, subject to additions of wayward hardware (H/W) and software (S/W) components that can destabilize while purporting to enhance the overall system.

When a computing system becomes unstable or otherwise inoperable, a technician (in-person or over the telephone) may attempt to ascertain the nature of the problem. For example, a technician may try to carefully walk a customer through various operating system (OS) and/or basic input-output system (BIOS) configuration screens over the telephone. The customer has to understand and read back the configuration settings to the technician which is an error-prone and frustrating process at best. This frustrating process typically follows a lengthy wait time which further taints a customer's mood.

Furthermore, because of the increasing complexity of the PC and a decreasing ability to quickly troubleshoot problems (especially in the field), major subsystem "swap-outs" have become more common as a "shotgun" approach to troubleshooting. These swap-outs typically have limited effectiveness when the replaced components are not the cause of the problem in the first place. Thus, a second, third, etc. service call is necessary to attempt to cure the problem. For example, during a service call, a technician may first replace the motherboard rather than attempt to diagnose the true nature of the problem. Replacing a motherboard results in downtime for the customer and, as further inconvenience, the customer typically has to go through a laborious process to reconfigure the system with the new motherboard. Motherboard replacements or swap-outs have been an issue for some time within the personal computing industry. Unfortunately, it often turns out that a replaced motherboard is fully operational and was not the problem which initiated the service call. Thus, the customer is again forced to initiate a service call and go through the frustrating and inefficient process once again.

DETAILED DESCRIPTION

Figure 1:
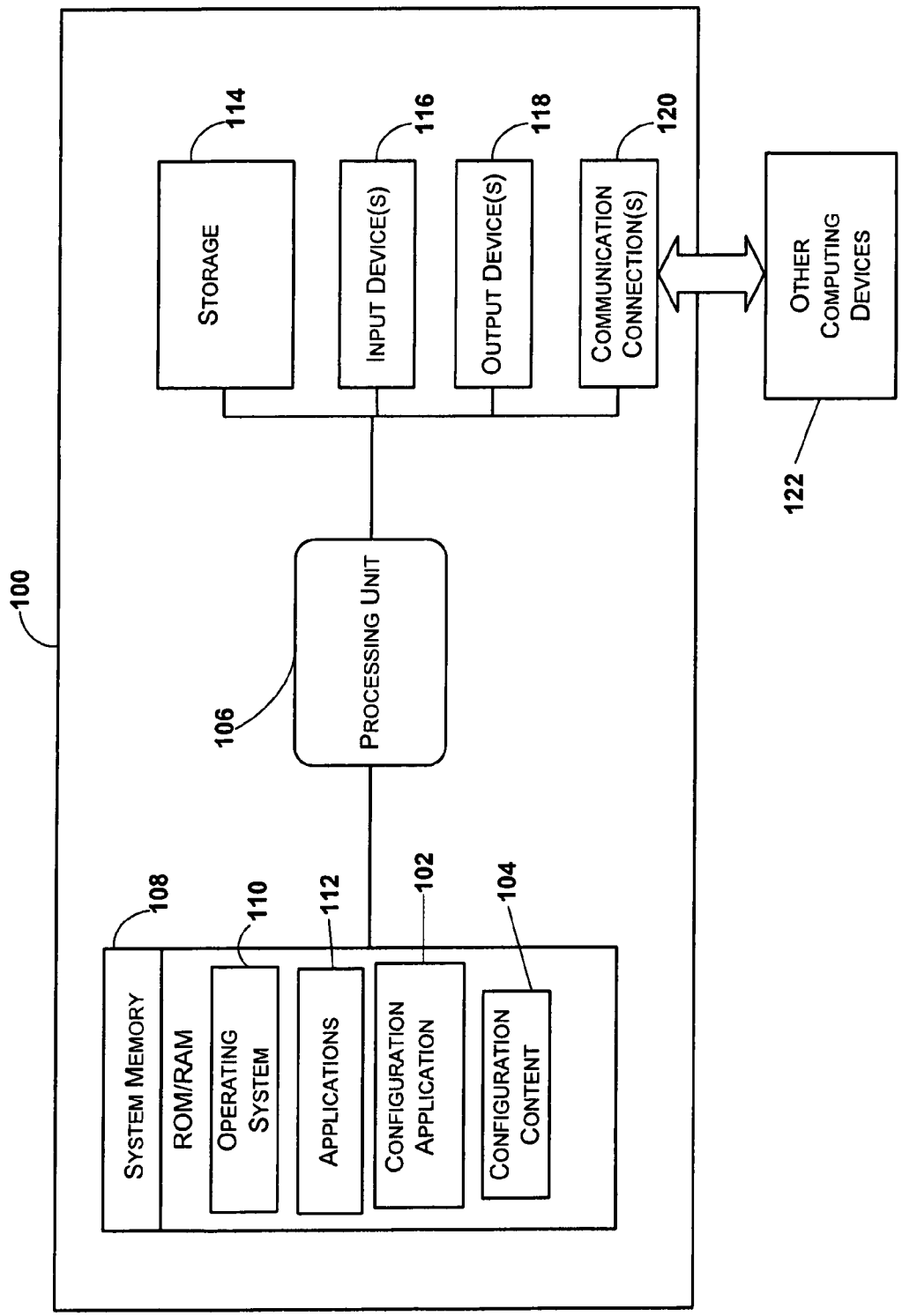
FIG. 1 is a block diagram of computing device including a configuration application and associated content, according to an embodiment.

A configuration application can be associated with a system, such as server, desktop, handheld device, and other computing devices. The configuration application is used to store configuration and other information, such as firmware settings and other low-level hardware related attributes associated with a system. The configuration application can store the configuration and other information to a storage device, such as non-volatile and/or volatile memory. For example, the configuration application is used to provide a robust, secure (tamper-resistant), and persistent "snapshot" of the configuration of a system at the time the system ships to a customer. As described herein, the "snapshot" can include state information associated with the system and can be gathered by a BIOS application, OS application, or a combination of both. At some later time, the configuration application can be used to compare the stored information to a current system configuration during a troubleshooting or other event. The configuration and other information can be stored via disk, flash-based, and/or some other storage depending on the level of access desired to the stored information or desired coupling to a motherboard (i.e. access when only motherboard is returned to factory) for example.

Accordingly, embodiments of a method and system for managing a system are described. According to an embodiment, the initial core system configuration information (e.g. "as shipped") associated with an initial state of the system is determined. The initial core system configuration information corresponds to the initial state of the system and is indicated as such. The initial core system configuration information is then stored in storage, such as non-volatile storage. Subsequent core system configuration information associated with a subsequent state of the system is also determined. The subsequent core system configuration information corresponds to the subsequent state of the system and is indicated as such. The subsequent core system configuration information is then also stored in storage, such as non-volatile storage.

The method and system provides a means to permanently and/or securely store core system configuration information so that the core system configuration information stays with a particular system, such as a computing device or motherboard for example. The method and system provides a means for channel integrators, manufacturers, and technicians to quickly troubleshoot and return a system to full service after receiving the system from a customer as part of an unstable or non-functioning system service event. The configuration application can be used to detect configuration changes deviating from the "as shipped" state, thereby directly contributing to better warranty management, reduced need for system component returns, and better customer service effectiveness. For example, the configuration application can be used during a troubleshooting procedure to compare configuration settings at different points in time to determine differences associated therewith which may be causing system instability or inoperability.

In the following description, numerous specific details are introduced to provide a thorough understanding of, and enabling description for, embodiments of operations using the configuration application. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 2:
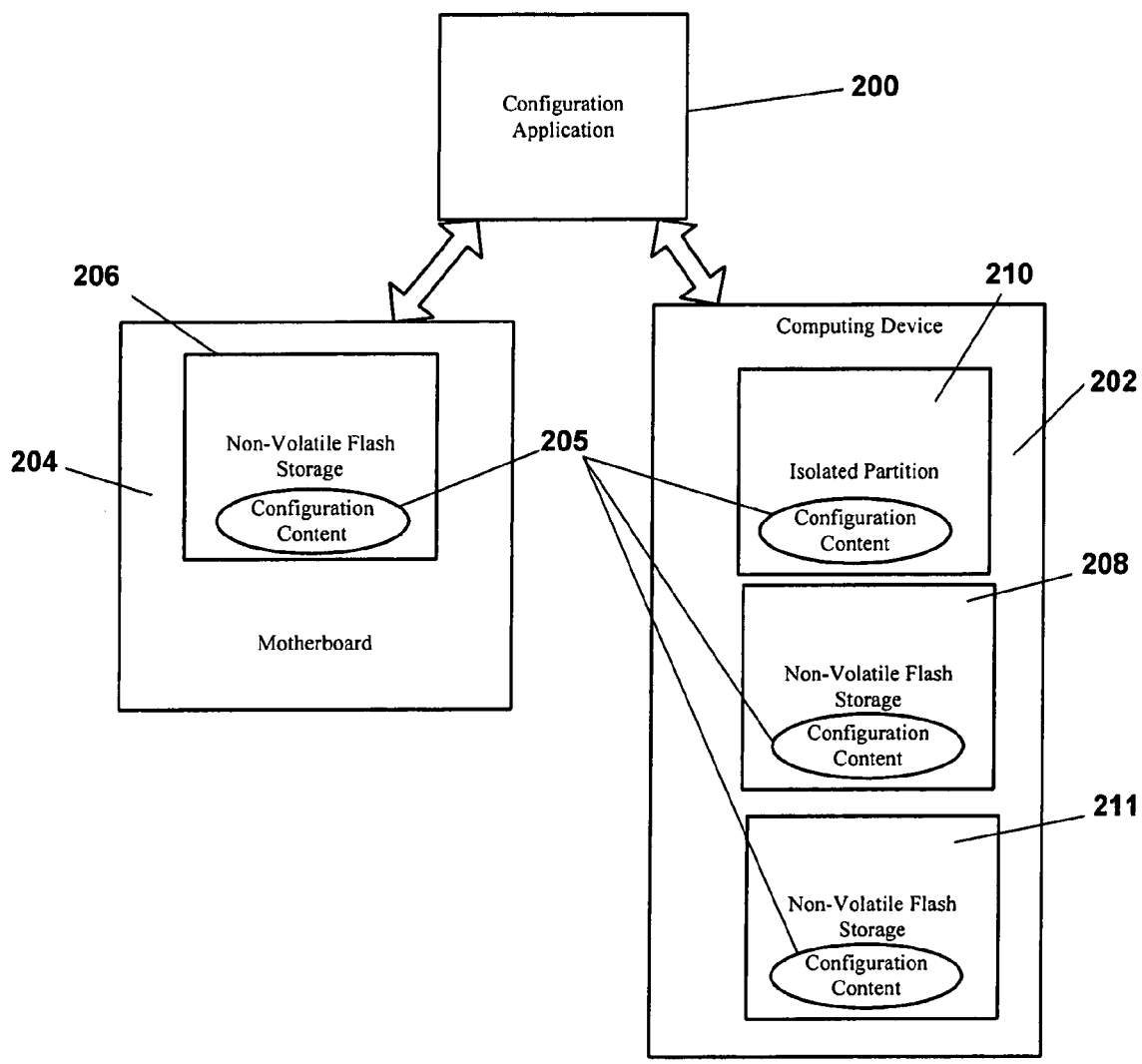
FIG. 2 is a block diagram of a configuration application, according to an embodiment.

FIG. 1 illustrates a computing device 100 including a configuration application 102 and configuration content 104 according to an embodiment. The configuration application 102 and associated content 104 are described below in detail as represented by the configuration application 200 as shown in FIG. 2, and the configuration application software stack 300 and related components shown in FIG. 3. The computing device 100 includes any computing system, such as a handheld, mobile computing system, a desktop computing system, laptop computing system, graphics-specific computing system, and other computing systems. The computing device 100 typically includes at least one processing unit 106 and system memory 108. Depending on the configuration and type of computing device, system memory 108 may be volatile (such as random-access memory (RAM) or other dynamic storage), non-volatile (such as read-only memory (ROM), flash memory, etc.) or some combination. The computing device 100 can include multiple processors and other devices.

The system memory 108 can include an operating system 110, and one or more applications 112. As described above, the system memory 108 can also include a vault configuration application 102, according to an embodiment. Computing device 100 may include additional computer storage 114, such as magnetic storage devices, optical storage devices, etc. Computer storage includes, but is not limited to, RAM, ROM, electrically erasable programmable read-only memory (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store information.

Computing device 100 may also include one or more input devices 116, such as keyboard, mouse, pen, audio input, tactile input device, etc., and one or more output devices 118, such as a display, speakers, printer, etc. Computing device 100 may also contain communication connections 120 that allow the computing device 100 to communicate with other computing devices 122 and systems, such as over a wireline and/or wireless network or other network.

A motherboard is another type of system that the configuration application 102 can be associated with. A motherboard typically contains a number of components, such as one or more processing units, firmware, one or more flash-chips including BIOS and other settings (e.g. non-volatile random access memory (NVRAM) state information), memory, mass storage interfaces, serial and parallel ports, expansion slots, and any controllers required to control standard peripheral devices, such as the display, keyboard, disk drive, etc. Firmware and the associated settings generally refer to software stored in memory, and are typically responsible for the behavior of the computing device 100 when it is first switched on. For example, the BIOS is typically stored in ROM as built-in software which enables the computing device 100 to boot itself without an operating system (OS). The BIOS can determine what a computer can do without accessing programs from a disk. The BIOS can contain code to control the keyboard, display, disk drives, serial communications, and a number of other functions. The BIOS can be copied from ROM to RAM each time the computer is booted which typically allows for faster operation. BIOS can also be implemented as flash BIOS, wherein the BIOS is recorded on a flash memory chip or other flash storage, and can be updated as needed. The motherboard can be implemented as more than one physically separate board to accommodate the physical restrictions of a system (e.g. handheld device).

FIG. 2 is a block diagram which illustrates a configuration application 200 configured to store, access, and analyze core configuration information associated with a system, according to an embodiment. For example, the configuration application 200 can store, access, and analyze core configuration information associated with a computing device 202 and/or motherboard 204. The configuration application 200 can be executed locally, via local processing components, or remotely, such as from a networked or otherwise coupled computing device. As described further below, the configuration application 200 can be used to store core configuration information gathered by firmware (BIOS for example), BIOS and an OS, or by an OS. The configuration application 200 can store core configuration information as configuration content 205 in non-volatile flash storage 206 which is coupled to the motherboard 204. Unless the flash storage 206 is removed from the motherboard 204, the core configuration information will be associated and available with the motherboard 204 due the non-volatile properties of the flash storage 206. By storing the core configuration information in the flash storage 206 of the motherboard 204, a robust and persistent "snapshot" of the fully functional motherboard configuration is achieved and tightly bound to the motherboard, such as before shipping the system to a customer.

Additionally, as described further below, the configuration application 200 can be used to access and analyze the stored core configuration information. The configuration application 200 can be used to access the stored core configuration information to troubleshoot an unstable or otherwise poorly operating motherboard 204. For example, the configuration application 200 can be used by technicians to detect core system configuration changes deviating from an "as shipped" state. Using the configuration application 200 leads to better warranty management, reduced need for motherboard and other "swap-out" returns in many cases, and better overall service effectiveness. As described below, rather than diagnosing the motherboard 204 or other component for a possible fault, the configuration application 200 is used to determine user-initiated configuration changes that are the source of many actual service situations.

The configuration application 200 is used to store critical and/or core configuration information as configuration content 205. The configuration application 200 is also used to access, transfer, and analyze critical and/or core configuration information as configuration content 205, as described below. The configuration content 205 can include, but is not limited to: firmware settings, BIOS non-volatile random access memory (NVRAM) settings (such as complementary metal-oxide semiconductor (CMOS) settings, system management basic input/output system (SMBIOS), and Thermal settings), and/or bus configuration information, such as peripheral component interconnect (PCI, PCIe, PCI-X, etc.) configuration settings. The configuration content 205 can also include various S/W components, such as OS, service pack level, and drivers including versions. As described below, the configuration application 200 can be used to transfer and store core configuration information to other storage, such as networked or other secure storage, depending on a particular implementation.

As shown in FIG. 2, the configuration application 200 can be used to store core configuration information as configuration content 205 in flash storage 208, a hidden or isolated partition 210, and/or system memory 211 of computing system 202. By storing the core configuration information in flash storage 208 and/or an isolated partition 210, a robust and persistent "snapshot" of the fully functional computing system 202 can be saved. For example, a robust and persistent "snapshot" of the fully functional computing system 202 can be saved, such as before shipping the computing system 202 to a customer.

The configuration application 200 also can be used to access and analyze the stored core configuration information.

The configuration application 200 can be used to access and analyze the stored core configuration information during a troubleshooting procedure on the computing system 202. For example, the configuration application 200 can be used by technicians, to detect configuration changes deviating from an earlier state to determine if a configuration change may be causing a problem. By utilizing storage apart from the normal file system, the configuration application 200 can support an OS-agnostic means for accessing the core configuration information, further boosting robust coverage of failure scenarios where the computing system 202 has destabilized to the point of prohibiting a normal OS boot. Moreover, depending on the storage component, the stored configuration content 205 can be accessed with minimal S/W functionality (i.e. without an OS boot, using BIOS POST code for example).

Figure 3:
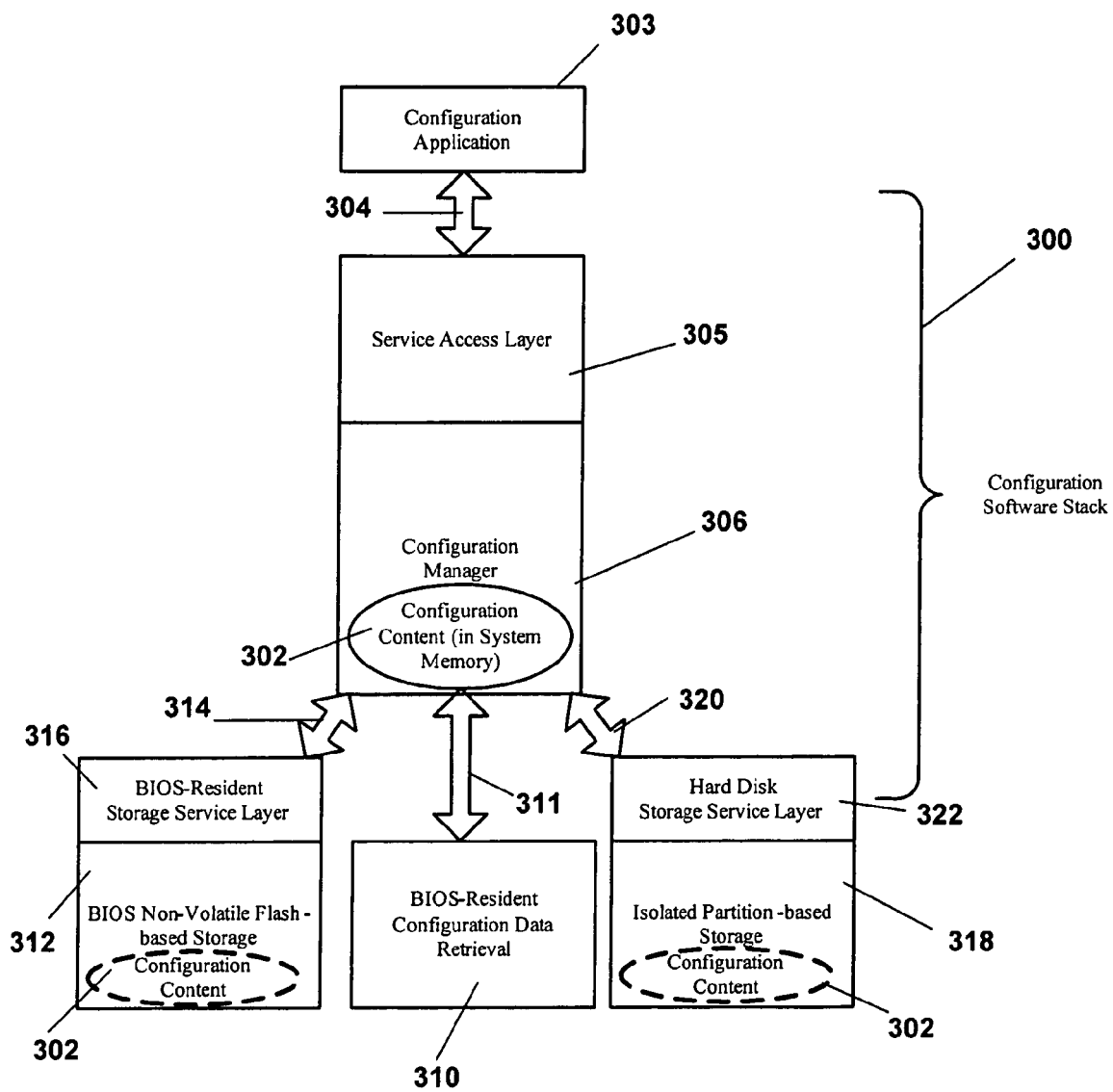
FIG. 3 is a block diagram which illustrates a configuration application software stack, according to an embodiment.

FIG. 3 is a block diagram which illustrates a configuration application software stack 300 configured to store various configuration and other information as configuration content 302, according to an embodiment. As described below, a utility applet 303 can be built and combined with the configuration application software stack 300. Loading and executing the applet 303 provides an interface to the functions of the configuration application software stack 300. The applet 303 can be loaded from a floppy disk, CD-ROM, universal serial bus (USB) thumbdrive, or other medium. In an alternate embodiment, the applet 303 can be included as part of the configuration application software stack 300.

As shown in FIG. 3, the configuration content 302 can be collected and stored initially in system memory, such as system memory 108. As described below, the applet 303 can utilize the configuration application software stack 300 to store configuration content 302 in other locations depending on a desired implementation. According to an embodiment, the configuration content 302 can include a core set of low-level hardware related attributes such as, but not limited to: firmware settings, BIOS NVRAM settings, CMOS settings, boot order, fast boot enable, SMBIOS settings, thermal settings, bus configuration settings (PCI, PCIe, PCI-X, etc.) and/or other information. The snapshot can also include various S/W components, such as OS, service pack level, and drivers including versions.

The configuration content 302 can include bus configuration settings, such as PCI configuration information for example. PCI configuration information is typically stored and accessible, such as by way of a set of registers. The PCI configuration information can include device id, vendor id, device class, etc. The PCI bus supports S/W access to the PCI configuration information to gather a complete list of all installed devices and the associated content. Various S/W input/output (I/O) functions can be used to access the content from the configuration space. Additionally, PCI information is gathered by BIOS during Power-On Self Test (POST). The BIOS POST also generates a BIOS event log containing recorded events detected during BIOS POST, such as a missing keyboard, etc. A BIOS interface can be used to retrieve this information while it is present in system memory 108.

As described above, the configuration content 302 can include CMOS Settings. The CMOS settings are typically visible and adjustable during BIOS Setup. BIOS Setup can be accessed during POST (usually by tapping a function key). CMOS settings include onboard device enable/disable, boot order, date, time, etc. The BIOS can be used to retrieve the CMOS settings (termed "Read CMOS" functions) via a predefined SW interface (for example, using SW traps) or the settings can be accessed via direct hardware reads. The S/W trap interface is accounted for in FIG. 3 as BIOS-Resident Configuration Data Retrieval 310 residing in flash-based storage and communicates with the configuration manager 306 via internal interface 311.

The configuration content 302 can also include a Configuration Event Log (CEL). The CEL can contain information associated with BIOS detected events. For example, the CEL can contain BIOS detected events during POST and made available through the S/W trap interface. These events can be stored as part of the configuration content 302. The configuration content 302 can further include SMBIOS settings. The SMBIOS settings generally refer to information used to track device presence and associated configuration. The SMBIOS settings are useful for inventory management. SMBIOS settings may include, but are not limited to, Processor ID, memory type(s)/ID(s), serial number, chassis and board manufacturer data, and other H/W configuration information. The BIOS can be used to access and retrieve the SMBIOS settings via a S/W interface, but is not so limited. As described above, the configuration content 302 can include other information such as the OS, service pack level, driver, etc.

The BIOS-Resident Configuration Data Retrieval 310 access mechanism and associated logic can be configured to capture additional information when desired. For example, the BIOS-Resident Configuration Data Retrieval 310 can capture configuration change events, such as any BIOS-detected change in configuration for subsequent storage. If there is insufficient storage to record the information, such as for multiple full data structures, the deltas or differences between earlier and later configuration states can be stored as a memory-conserving optimization. The configuration content 302 can include other core level information according to a particular implementation.

As shown in FIG. 3, the applet 303 accesses various functions of the configuration software stack 300 via a service interface 304 which is in communication with a service access layer 305 of the configuration software stack 300. The service interface 304 includes a set of function calls which the applet 303 can utilize to implement corresponding functionality. The service access layer 305 can be implemented as DLL/device driver combination for example. The service access layer 305 implements service interface 304 by making it available to applet 303 and implementing each function by mapping to the equivalent function of the service interface 304, and returns results in a complementary manner. Moreover, the service interface 304 provides a means for a user to expose and build more functionality around the configuration software stack 300.

According to an embodiment, the applet 303 uses the service interface 304 to issue function calls and initiate an action by the configuration manager 306. The configuration manager 306 includes functionality for storing and maintaining information, such as one or more data structures representative of the configuration content 302. In an embodiment, the configuration manager 306 can be implemented in firmware. The one or more data structures can include the same data set definition while containing different snapshots of actual system information. For example, a data structure can be a simple list of all gathered information, as well as some additional attributes, identifiers, or delimiters, such as a unique identifying tag, time/date stamp, and any other identifying fields. The configuration content 302 is tailored to what cannot be readily captured by other system software, so as to minimize redundancy while also maximizing use of available storage. The configuration manager 306 includes functionality for populating the structure(s) on demand. The configuration manager 306 also includes functionality for directing transfer of the information between system memory 108 and other storage, such as BIOS non-volatile flash-based storage 312 via BIOS interface 314 and the BIOS-Resident Storage Service layer 316. The BIOS-Resident Storage Service layer 316 resides in flash-based storage 312 and provides primitive functions for utilizing the flash-based storage 312.

The configuration manager 306 includes functionality for directing transfer of the information between system memory 108 and other storage, such as an isolated partition 318 of a hard disk drive via hard disk interface 320. The Hard Disk Storage Service layer 322 includes functionality for acquiring and reserving a suitably protected area (such as such as the isolated partition 318) of a hard disk for the configuration content 302. The information can be securely stored by storing the information in the isolated partition 318 to prevent deleting or tampering with the configuration content 302. The configuration manager 306 can be implemented as a data link library (DLL)/device driver combination for example. The configuration manager 306 can be configured to transfer information to other storage according to a particular implementation.

The applet 303 can use the service interface 304 to issue a first function call, a "Record" function call for example, which initiates a "gather and store" action by the configuration manager 306. The applet 303 can also use the service interface 304 to issue a "Tag" function call which operates to tag "Record" function calls with an associated tag identifier. When called, the configuration manager 306 populates a data structure with information which includes a tag identifier. For example, when called, the configuration manager 306 populates a data structure with core configuration information at the completion of successful system assembly and integration, tagging the information with an "INITIAL STATE" tag. Providing a tag as part of the function call lets the user define tag values at the applet level. The configuration content 302 can consist of multiple data structures, each populated with configuration information valid at the time the function is called, but is not so limited.

The applet 303 can use the service interface 304 to issue other function calls. For example, the applet 303 can use the service interface 304 to issue an "Add" function call, which allows applet-defined data, such as site or assembler ID information, Service ticket number, etc., to be added to the configuration content 302. As another example, the applet 303 can use the service interface 304 to issue a "Compare" function call", allowing a comparison to be made between the different data structures identified by tag data supplied with the call. The "Compare" function call can be implemented to return a simple PASS/FAIL, including a list of items that failed in the comparison for the FAIL case.

Another example includes the applet 303 using the service interface 304 to issue a "Get" function call to retrieve information (identified by tag data in the case of more than one structure being available) from system memory 108 or other storage. This function call allows detailed user browsing of the gathered configuration content 302. As further example, the applet 303 can use the service interface 304 to issue a "Commit" function call which allows configuration content 302 stored in system memory 108 to be transferred to other storage, such as non-volatile flash storage 312 (as configuration content 302), an isolated partition 318 (as configuration content 302), or some other storage. Tag data, such as "Tag ID", can be used to delineate a specific structure when multiple structures exist. The "Commit" function call can be used to specify a specific storage destination, while also providing tamper-resistant mechanisms, such as encryption, digital signing, check summing, etc.

Figure 4:
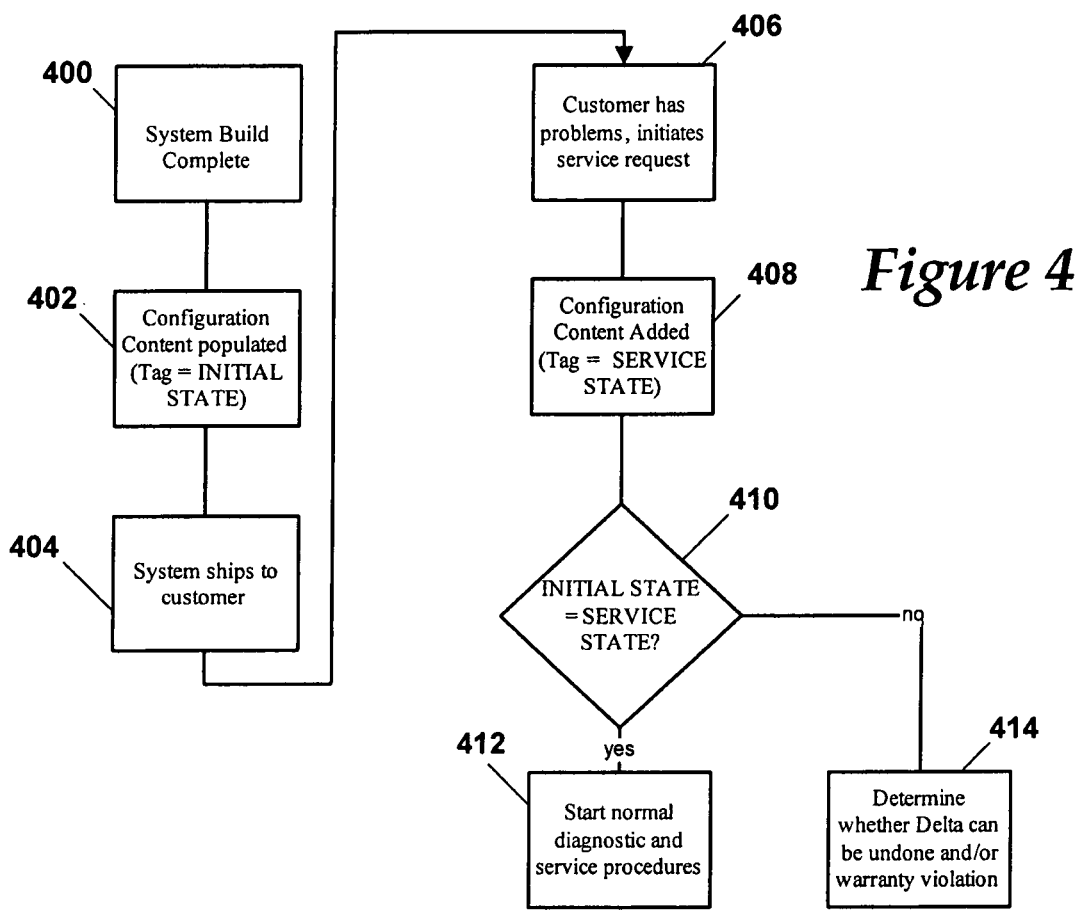
FIG. 4 is a flow diagram illustrating an exemplary scenario of using a configuration application.

FIG. 4 is a flow diagram illustrating an example of using the configuration application 102 to store, transfer, and analyze configuration content 104. At 400, the build process of a system, such as a computing device or motherboard, is complete including the various core configuration settings described in detail above. At this time, the system is fully functional and operational. At 402, the configuration application 102 populates a data structure with gathered configuration information and tags the information with an "INITIAL STATE" attribute flag. At this point, the configuration application 102 can transfer and store the configuration information in flash-based or an isolated partition storage using the "COMMIT" command for example.

At 404, the system ships to a customer. At 406, the customer initiates a service request due to a system malfunction or other issue. At 408, the configuration application 102 is used to populate another data structure with configuration information associated with the current system state, and tags the information with a "SERVICE STATE" attribute flag. At this point, the configuration application 102 can transfer and store this configuration information in flash-based storage, an isolated partition, or some other storage using the "COMMIT" command for example. At 410, the configuration application 102 is used to compare the two data structures to determine if the core system configuration information has been altered since user-initiated configuration changes are the source of many service situations.

The configuration application 102 can be used to detect deltas before deciding next steps to address a particular problem. By including additional SERVICE STATE tagged structures it is possible to track configuration deltas at a finer grained level, allowing a "rollback" to a prior known working state, or facilitating failure analysis via tighter isolation of the delta occurring just before the failure. If the core system configuration information has not been altered, the system can be serviced according to normal diagnostic and service procedures at 412. If the core system configuration information has been altered, at 414, it is determined whether the alteration(s) can be reversed and/or have violated certain warranty provisions.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Embodiment may also be implemented as microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

What is claimed is:

1. A method for managing a system comprising:
    determining initial core system information associated with an initial state of the system by determining basic input/output system (BIOS) information, complementary metal-oxide semiconductor (CMOS) settings, system management basic input/output system (SMBIOS), and bus configuration settings;
    indicating that the initial core system information corresponds to the initial system state;
    storing the initial core system information;
    determining subsequent core system information associated with a subsequent state of the system;
    indicating that the subsequent core system information corresponds to the subsequent system state; and
    storing the subsequent core system information.

2. The method of claim 1, further comprising storing the initial core system information in flash-based memory.

3. The method of claim 1, further comprising storing the initial core system information in secure storage to prevent tampering with the initial core system information.

4. The method of claim 1, further comprising storing the subsequent core system information in flash-based memory.

5. The method of claim 1, further comprising storing the subsequent core system information in secure storage to prevent tampering with the subsequent core system information.

6. The method of claim 1, further comprising comparing the initial core system information to the subsequent core system information to determine whether the initial core system information has been altered.

7. The method of claim 1, further comprising storing the initial core system information on a motherboard.

8. The method of claim 7, further comprising binding the initial core system information to the motherboard before shipping the motherboard.

9. The method of claim 7, further comprising using the initial core system information during a troubleshooting procedure.

10. The method of claim 9, further comprising using the initial core system information during a troubleshooting procedure to detect configuration changes deviating from the initial system state.

11. A non-transitory computer-readable medium having stored thereon instructions, which when executed in a system operate to manage system-related information by:
    determining initial core system information associated with an initial state of the system by determining basic input/output system (BIOS) information, complementary metal-oxide semiconductor (CMOS) settings, system management basic input/output system (SMBIOS), and bus configuration settings;
    indicating that the initial core system information corresponds to the initial system state;
    storing the initial core system information;
    determining subsequent core system information associated with a subsequent state of the system;
    indicating that the subsequent core system information corresponds to the subsequent system state; and
    storing the subsequent core system information.

12. The medium of claim 11, wherein the instructions, when executed further comprise storing the initial core system information in flash-based memory.

13. The medium of claim 11, wherein the instructions, when executed further comprise storing the initial core system information in secure storage to prevent tampering with the initial core system information.

14. The medium of claim 11, wherein the instructions, when executed further comprise comparing the initial core system information to the subsequent core system information to determine whether the initial core system information has been altered.

15. The medium of claim 14, wherein the instructions, when executed further comprise comparing the initial core system information to the subsequent core system information to determine whether subsequent changes can be undone.

16. The medium of claim 11, wherein the instructions, when executed further comprise determining initial core system information associated with an initial state of the system including operating system information.

17. A system comprising:
a memory;
a processor in communication with the memory; and
a configuration application executed by the processor and
  configured to, determine initial core system information associated with an initial state of the system by determining basic input/output system (BIOS) information, complementary metal-oxide semiconductor (CMOS) settings, system management basic input/output system (SMBIOS), and bus configuration settings;
indicate that the initial core system information corresponds to the initial system state;
store the initial core system information to the memory;
determine subsequent core system information associated with a subsequent state of the system;
indicate that the subsequent core system information corresponds to the subsequent system state; and
store the subsequent core system information to the memory.

18. The system of claim 17, further comprising flash-based storage for storing the initial core system information.

19. The system of claim 17, further comprising tamper-resistant storage for storing the initial core system information.

20. The system of claim 17, wherein the system comprises a motherboard.

21. The system of claim 17, wherein the memory includes one or more data structures for storing core system information.

* * * * *